US006425473B1

(12) United States Patent
Meisser et al.

(10) Patent No.: US 6,425,473 B1
(45) Date of Patent: Jul. 30, 2002

(54) EQUIPMENT FOR THE LINEAR FEEDING OF CABLE ENDS TO FINISHING UNITS

(75) Inventors: Claudio Meisser, Cham; Alois Lustenberger, Littau; Martin Stocker, Küssnacht; Roberto Gasperi, Ebikon, all of (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 09/626,229

(22) Filed: Jul. 26, 2000

(30) Foreign Application Priority Data

Jul. 26, 1999 (EP) ............................................ 99810672

(51) Int. Cl.[7] ............................................... B65G 37/00
(52) U.S. Cl. ................................. 198/346.2; 198/468.2
(58) Field of Search ........................... 198/346.2, 468.2, 198/750.11; 140/105

(56) References Cited

U.S. PATENT DOCUMENTS 4,858,311 A 8/1989 Koch
4,862,587 A 9/1989 Nakata et al.
5,309,633 A * 5/1994 Ricard ......................... 29/861
5,829,572 A * 11/1998 Faraoni et al. ........... 198/346.2
5,992,009 A * 11/1999 Bonura ...................... 29/346.2
6,042,166 A 3/2000 Conte

FOREIGN PATENT DOCUMENTS

CH 673 858 4/1990
EP 302 804 2/1989
EP 876 885 A1 11/1998

* cited by examiner

*Primary Examiner*—Christopher P. Ellis
*Assistant Examiner*—Khoi H. Tran
(74) *Attorney, Agent, or Firm*—Cohen, Pontani, Lieberman & Pavane

(57) ABSTRACT

A finishing installation for cables includes a cable unit, a cable feeder and finishing units. The leading cable end is seized by a loop-laying device and turned horizontally through 180°. At the same time, the cable is advanced by a cable-advancing device and straightened by the straightening path. An encoder measures the length of the advanced cable, while a cable loop is formed during the advancing of the cable. For the taking-over, feeding and delivery of cable ends, the cable feeder has a first transfer unit, which is displaceable along a transfer guide, with a first gripper unit and a second transfer unit, which is displaceable along the transfer guide, with a second gripper unit. Control equipment controls and monitors the finishing installation, wherein the movements of, in particular, the transfer equipment and the gripper units are freely programmable.

7 Claims, 8 Drawing Sheets

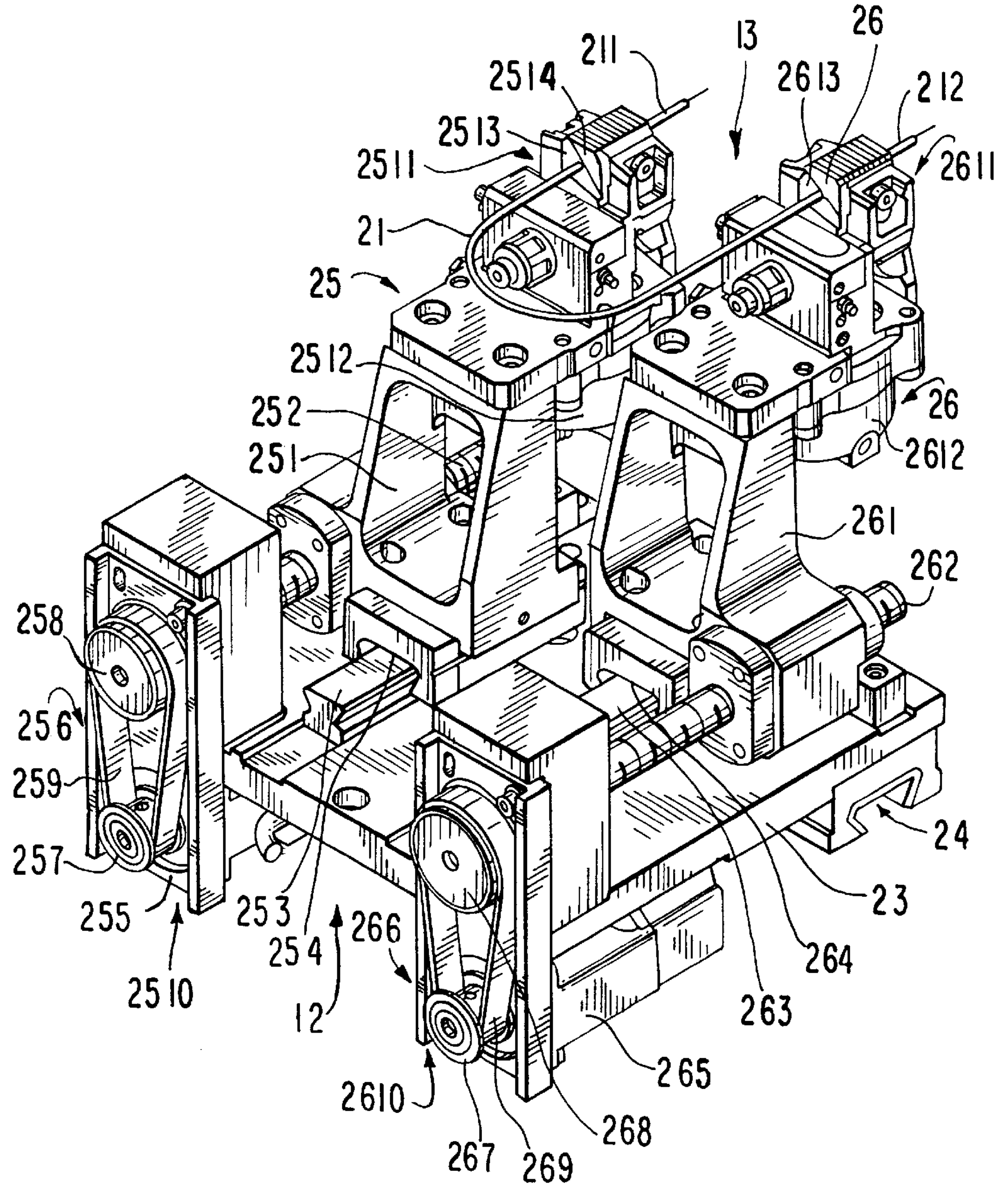
FIG. 2
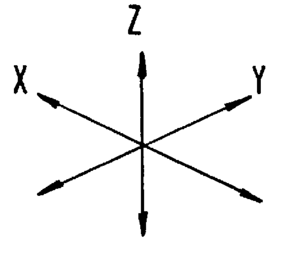

EQUIPMENT FOR THE LINEAR FEEDING OF CABLE ENDS TO FINISHING UNITS

BACKGROUND OF THE INVENTION

1. Field of the Invention

The invention relates to equipment for the linear feeding of cable ends to finishing units, which process the cable ends.

2. Discussion of the Prior Art

A cable-treatment apparatus, by means of which the cable is cut to length, freed of insulation at the ends and provided with a crimped contact, is known from U.S. Pat. No. 4,862,587. The cable ends are fed by means of a transfer device to a processing station. For this purpose, grippers, which take over a cable to be transported and feed it to the processing station, are arranged at an endless chain. The endless chain comprises a linear portion in the region of the processing stations and is guided back by way of deflecting wheels. A lever mechanism closes and opens the grippers. The spacing of the grippers from each other is chosen so that the following gripper gets into the initial position of the leading gripper standing in the last processing station.

A disadvantage of the known apparatus is that the grippers are connected mechanically by way of the chain. The processing stations must be oriented to the chain and to the spacing of the grippers from each other in the chain. The smallest possible change in spacing is predetermined by the length of a chain member. Moreover, the play between the chain and chain wheel, which is caused by the engagement of the chain wheels in the chain, has a negative effect on the accuracy of laying-in of the grippers, which in turn influences the quality of the crimped connection. The play can also set itself only in the course of time and/or vary in the course of time.

SUMMARY OF THE INVENTION

Accordingly, it is an object of the present invention to provide equipment for the linear feeding of cable ends to finishing units which avoids the disadvantages of the prior art and which simplifies the finishing of cables.

Pursuant to this object, and others which will become apparent hereafter, one aspect of the present invention resides in equipment for linear feeding of cable ends to finishing units which process the ends, which equipment comprises a transfer guide, a cable feeder having at least one transfer unit which is movable in a forward and rearward direction along the transfer guide, and a gripper unit operative to move the cable ends in at least one direction. The gripper unit is arranged at the transfer unit so that the transfer unit and the gripper unit are operatively arranged to take over, feed and deliver the cable ends.

In another embodiment of the invention the transfer unit is movable linearly in one direction and the gripper unit is movable linearly in at least one other direction.

In still a further embodiment more than one transfer unit is provided. The transfer units are independently operable.

In still another embodiment more than one gripper unit is provided wherein the gripper units are operative independently of one another.

In yet a further embodiment of the invention the gripper unit includes gripper elements which are movable independently of each other. The gripper elements each have grippers. It is possible for each of the gripper elements to be movable in a y-direction by a spindle. It is furthermore possible for the gripper units to be movable in a z-direction.

The advantages achieved by the invention are to be seen substantially in that a modular construction of the finishing installation is possible by the cable feeder according to the invention. The finishing installation can be equipped according to application with more or fewer finishing units. Accordingly, the cable feeder can be adapted in its performance capability. The calibration of the positions to be moved towards for the cable feeding can take place, for example, manually or by means of a learning travel after the assembly of the finishing installation or after a re-equipment of the finishing installation. It is furthermore advantageous that cables of different cable diameters can be finished without re-equipping the cable feeder. The cable feeder can take into consideration the depth of laying-in, which is dependent on the diameter of the cables and thus different, during the feeding of the cables to the finishing units. The cable parameters can be communicated to the cable feeder in terms of software.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 shows a first transfer unit, which carries a gripper unit, of the cable feeder;

DETAILED DESCRIPTION OF THE PREFERRED EMBODIMENTS

Figure 1:
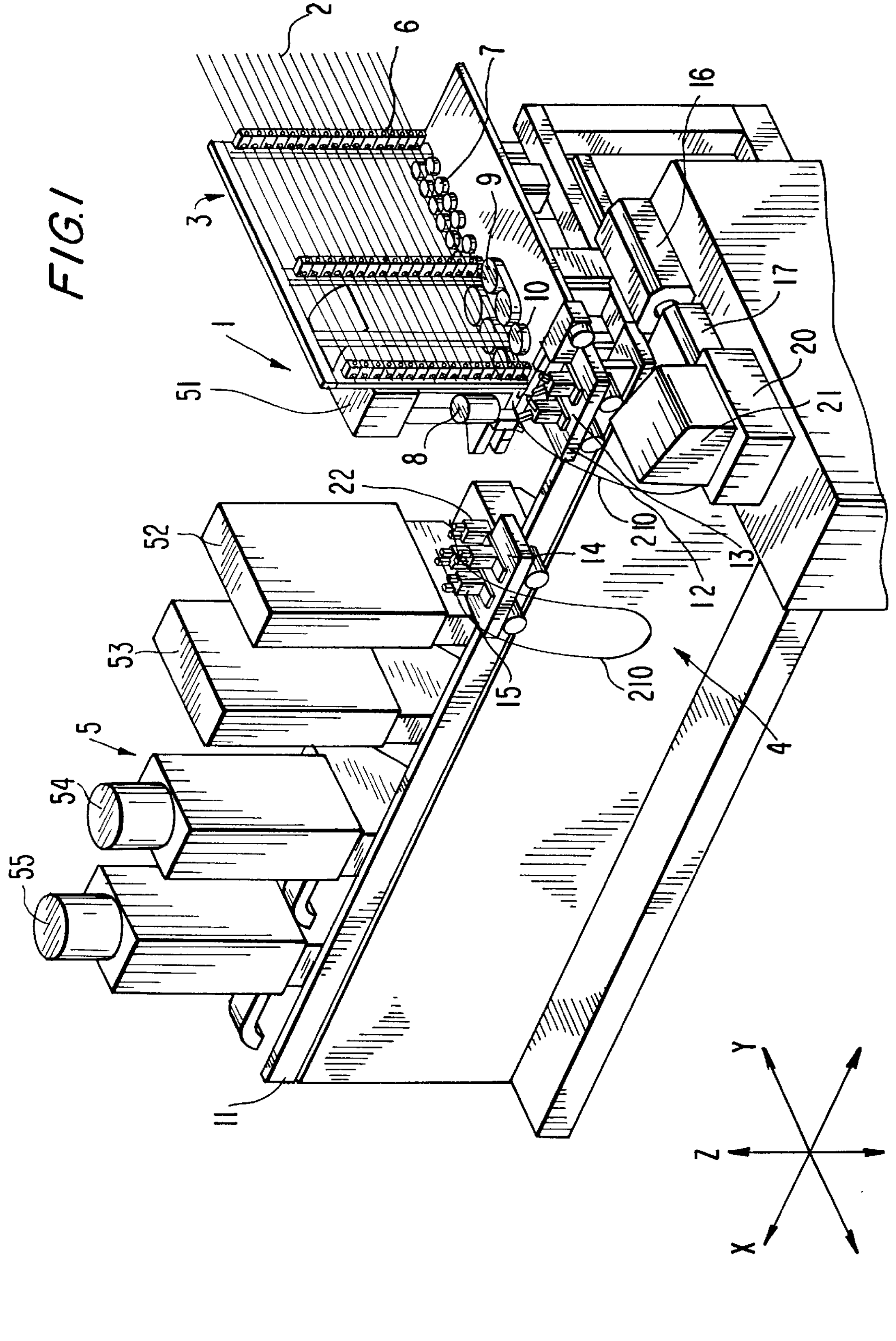
FIG. 1 shows a finishing installation with finishing units and a cable feeder with two transfer units.
Figure 5:
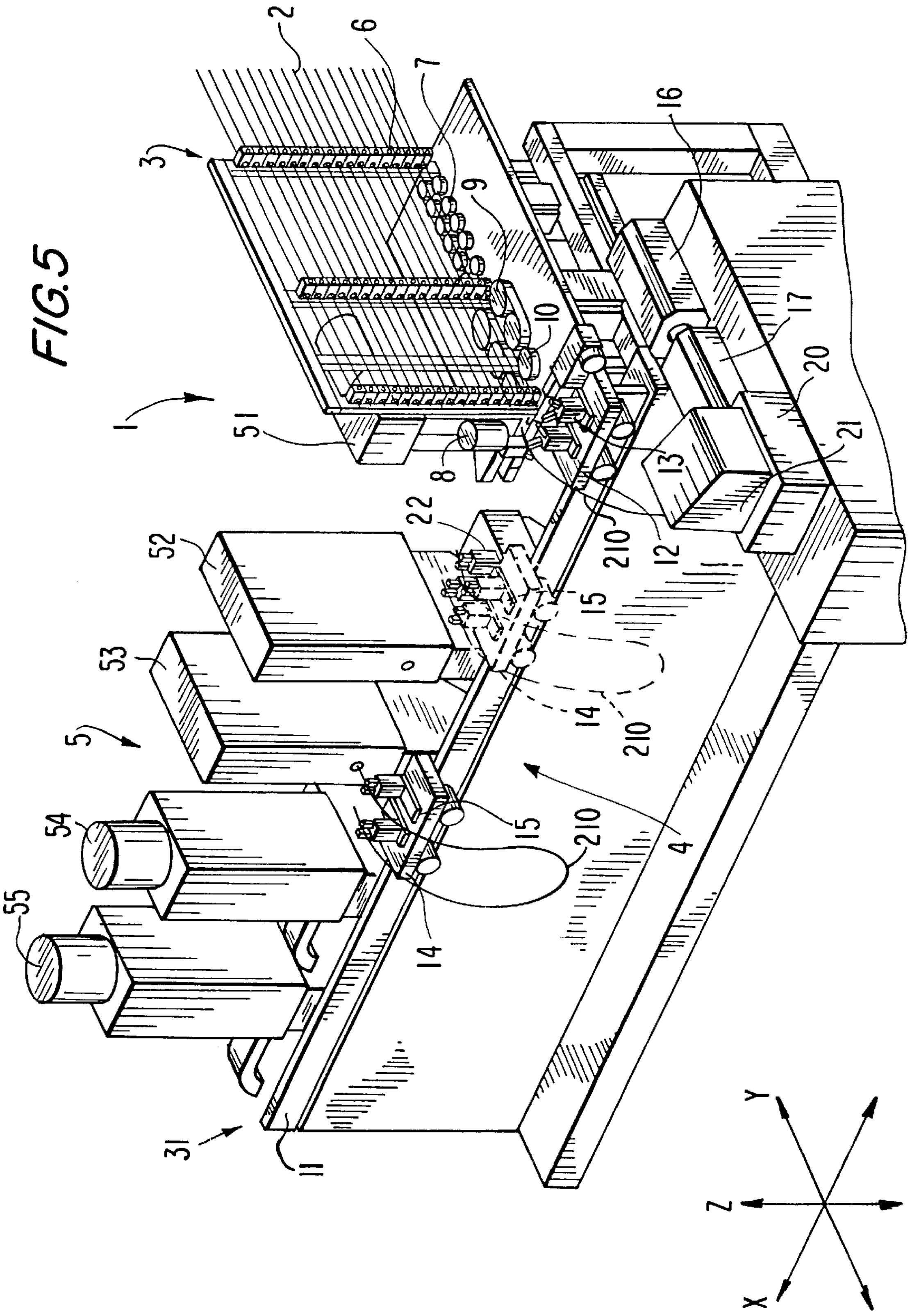
FIG. 5 shows the finishing installation with a second transfer unit during the taking-over of a cable and during the feeding of the cable to a finishing unit.
Figure 6:
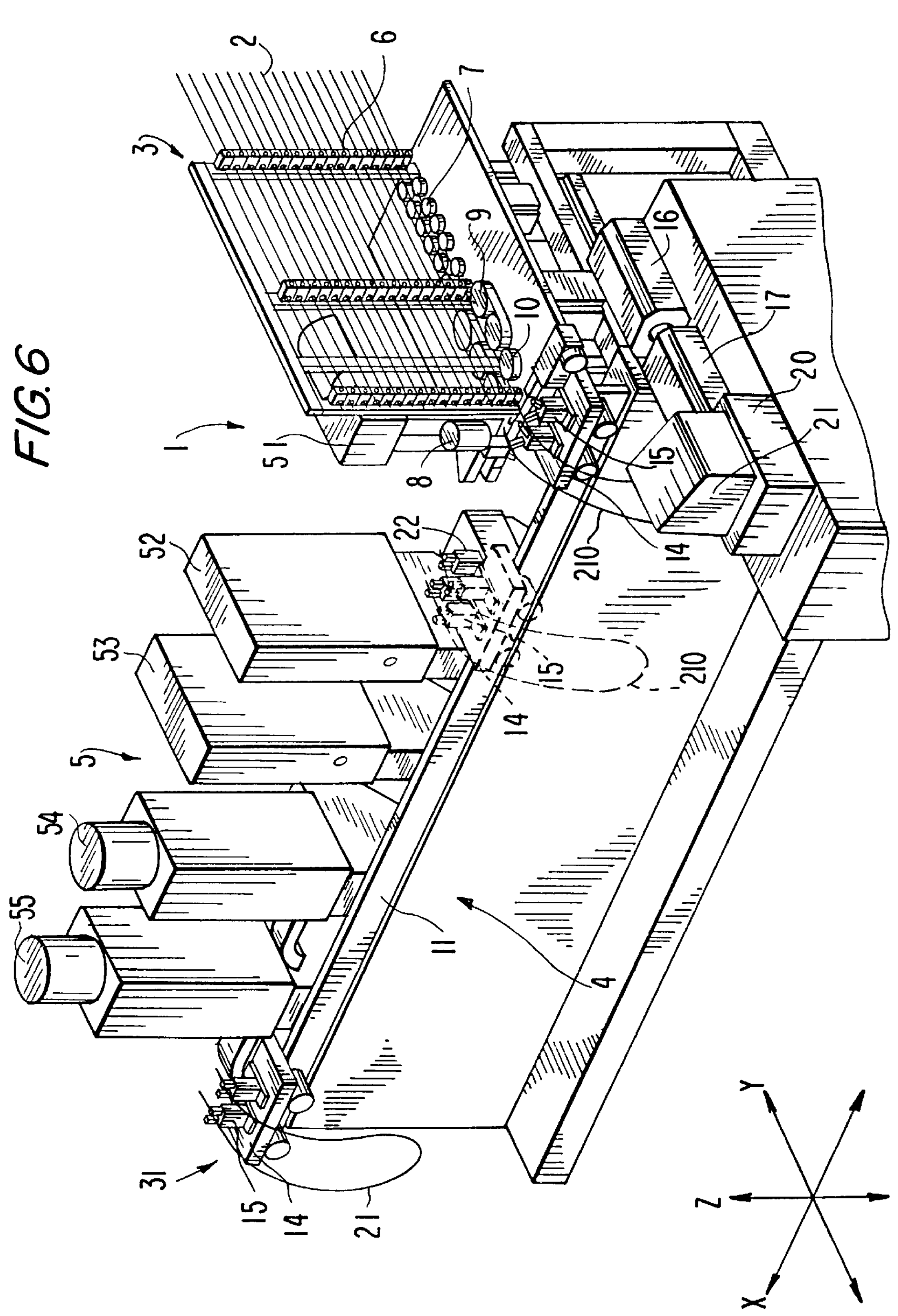
FIG. 6 shows the finishing installation with a second transfer unit during the taking-over of a cable and during the delivery of the cable after the finishing.
Figure 10:
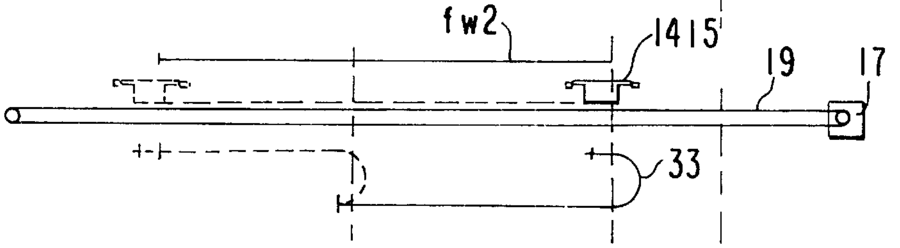

FIG. 1 shows a finishing installation 1 for cables 2, which installation comprises a cable unit 3, a cable feeder 4 and finishing units 5. For example, insulation-stripping stations 51, sleeving stations 52 and 53 and/or crimping stations 54 and 55 are provided as finishing units 5. Further and/or other kinds of finishing stations are also possible. Cables 2 with different cross-sections, colors and construction are retained in a cable changer 6 which is adjustable in height. By cables 2, different cables or conductors including optical conductors are meant in the matters of construction, diameter and color. The cable type to be finished is brought into a straightening path 7 by height adjustment of the cable changer 6. The leading cable end is seized by a loop-laying device 8 and turned horizontally through 180°. At the same time, the cable 2 is advanced by means of a cable feed 9 and straightened by means of the straightening path 7. An encoder 10 measures the length of the advanced cable 2, wherein a cable loop 210 is formed during the advancing of the cable 2. The cable feeder 4 consists of a first transfer unit 12, which is displaceable along a transfer guide 11, with a first gripper unit 13 and a second transfer unit 14, which is displaceable along the transfer guide 11, with a second gripper unit 15. A first drive 16 moves the first transfer unit 12 along the transfer guide 11. A second drive 17 moves the second transfer unit 14 along the transfer guide 11. The drives 16, 17 can be, for example, stepping motors which drive the transfer units 12, 14 linearly by means of a first toothed belt 18 and second toothed belt 19, respectively (FIG. 10). As a variant of this embodiment, the drive 16, 17 can also be, for example, a linear drive with a linear motor. The direction of movement of the transfer units 12, 14 is denoted by x. The directions of movement of the gripper units 13, 15 are denoted by y and z. A control apparatus 20 controls and monitors the finishing installation 1, wherein the movements of, in particular, the transfer units 12, 14 and the gripper units 13, 15 are freely programmable. Moreover, the control apparatus 20 can, during the control of the transfer units 12, 14 and the gripper units 13, 15, for example in the case of a change of the cable type to be finished, immediately adapt the movement, in particular of the gripper unit 13, 15 in y direction, to the cable diameter. A not-illustrated keyboard and an image screen 21 serve as interface between man and machine. The first gripper unit 13 takes over the leading cable end 211 of the cable loop 210 from the loop-laying device 8 and the trailing cable end 212 of the cable loop 210 from the cable changer 6. After cutting the cable, the first transfer unit 12 moves towards the insulation-stripping station 51, which removes the cable sheath at the cable ends 211, 212. After the installation-stripping operation, the first transfer unit 12 moves with the cable loop 210 further to a first transfer station 22, passes the cable loop 210 over to the station 22 and moves back to the initial position. The second transfer unit 14 takes over the cable loop 210 at the transfer station 22 and brings the cable loop to at least one sleeving station 52, 53 and/or to at least one crimping station 54, 55. Details of this are illustrated in FIGS. 5 and 6.

FIG. 2 shows details of the first transfer unit 12 with the first gripper unit 13. A first transfer shoe 24 with cage rollers, which together with the transfer guide 11 forms a roller guide, is arranged at a first transfer bracket 23. The gripper unit 13, consisting of two independently operating gripper elements 25, 26, is arranged at the first transfer bracket 23. The first gripper element 25 consists of a first slide 251, which is driven by means of a first spindle 252 and which is displaceable in the y-direction by means of a first slide guide 253 arranged at the transfer bracket 23 and a first slide groove 254 of the first slide 251. The first slide drive 2510 consists of the first spindle 252, a first slide motor 255, for example an alternating current synchronous motor, a first transmission 256 with a first belt pulley 257, a second belt pulley 258 and a first belt 259. The transmission ratio of the first slide motor 255 to the first spindle 252 can be adapted by different diameters of the belt pulleys 257, 258. In place of the shown first slide drive 2510, for example, a linear drive with a linear motor can also be provided. A first gripper 2511 consisting of a first gripper drive 2512, for example a pneumatic drive, and of meshing gripper claws 2513, 2514 is arranged at the first slide 251, wherein the gripper claws 2513, 2514 retain the leading cable end 211 stripped of insulation.

The second gripper element 26 consists of a second slide 261, which is driven by means of a second spindle 262 and displaceable in the y-direction by means of a second slide guide 263 arranged at the transfer bracket 23 and a second slide groove 264 of the second slide 261. The second slide drive 2610 consists of the second spindle 262, a second slide motor 265, for example an alternating current synchronous motor, a second transmission 266 with a third belt pulley 267, a fourth belt pulley 258 and a second belt 269. The transmission ratio of the second slide motor 265 to the second spindle 262 can be adapted by different diameters of the belt pulleys 267, 268. In place of the shown second slide drive 2610, for example, a linear drive with a linear motor can also be provided. A second gripper 2611 consisting of a second gripper drive 2612, for example a pneumatic drive, and of meshing gripper claws 2613, 2614 is arranged at the second slide 261, wherein the gripper claws 2613, 2614 retain the trailing cable end 212 stripped of insulation.

Two pivotable stirrups, which serve as a lateral guide of the cable loop 210 and bring the cable loop 210 to the spacing of the grippers 2511, 2611 before the take-over of the cable ends 211, 212 by the grippers 2511, 2611, are not illustrated.

The gripper elements 25, 26 operate completely independently from each other. The control of the slide motors 255, 265 and the grippers 2511, 2611 takes place by means of the control apparatus 20 and is freely programmable. As a variant, the transfer unit 12 can also be equipped with a gripper unit with only one gripper element.

Figure 3:
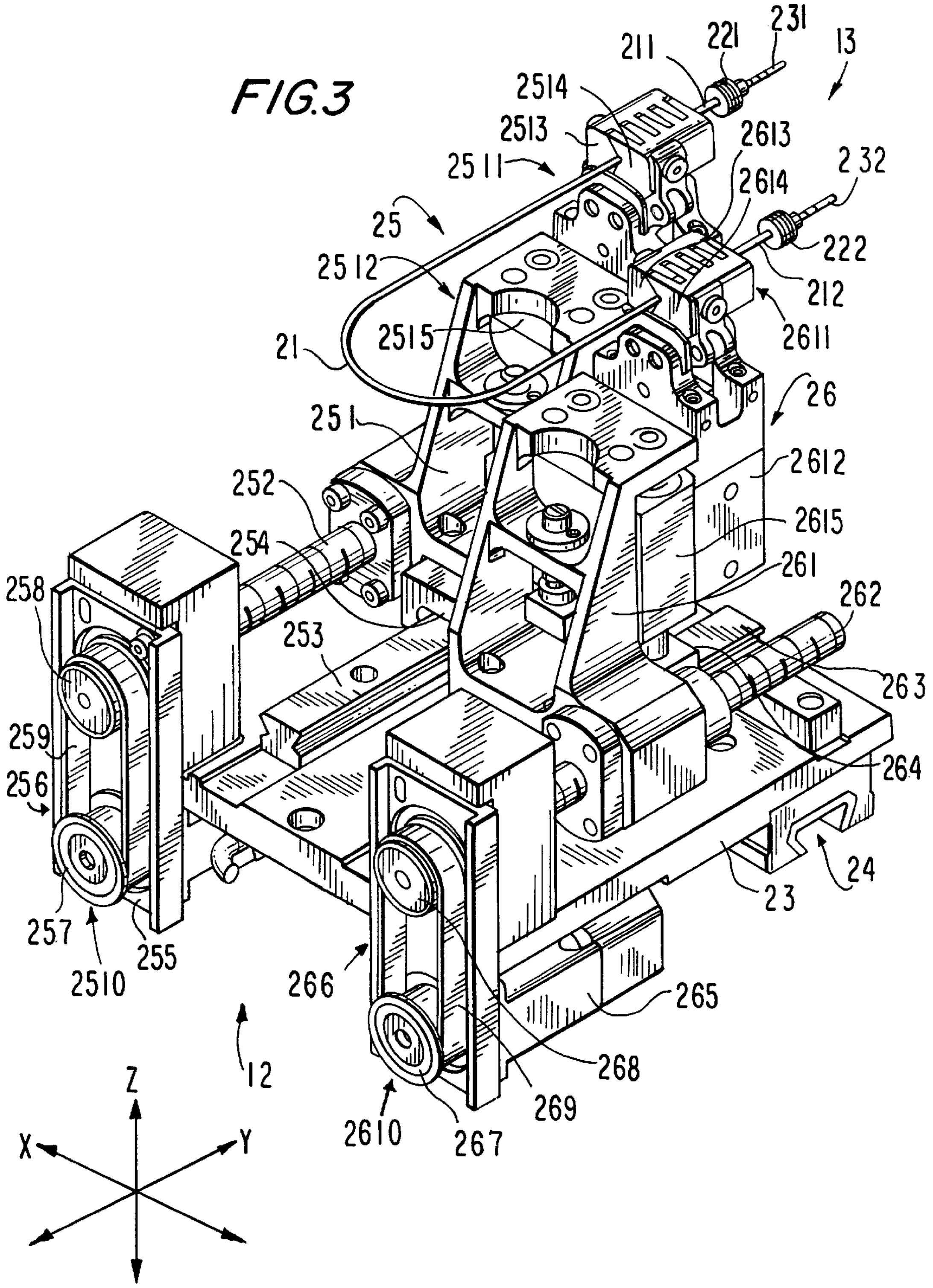
FIG. 3 shows a second transfer unit, which carries a gripper unit with two lowerable grippers, of the cable feeder.

FIG. 3 shows the second transfer unit 14, which carries two lowerable grippers 2511, 2611, of the cable feeder 4. The second transfer unit 14 with the second gripper unit 15 is constructed in a manner comparable with that of the first transfer unit 12 and the first gripper unit 13, respectively. The reference symbols for the parts of the second transfer unit 14 and the second gripper unit 15, respectively, have therefore been taken over from the first transfer unit 12 and the first gripper unit 13, respectively. By contrast to the first gripper unit 13, the grippers 2511, 2611 of the second gripper unit 15 are lowerable in the z-direction. The grippers 2511, 2611 are arranged at linear guide elements 2515, 2615, which are acted on by an upwardly acting spring force. During the crimping operation, the crimping station 54, 55 acts by a downwardly acting force on the gripper 2511, 2611. In that case, the cable end 211, 212 stripped of insulation and for example already provided with a sleeve 221, 222 is lowered in the z-direction into a crimping contact 231, 232 and connected therewith in terms of crimping technique.

Figure 4:
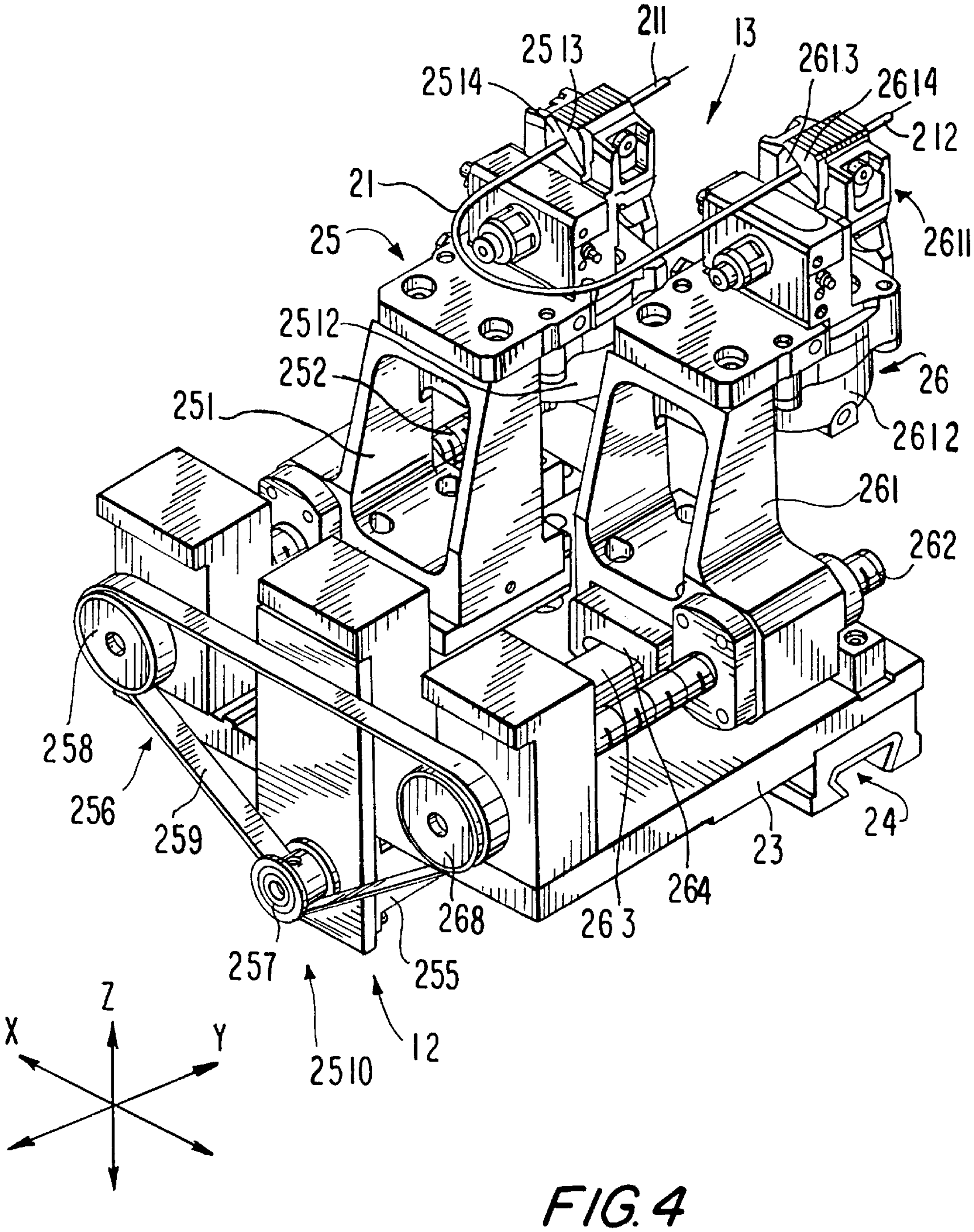
FIG. 4 shows another embodiment of the transfer unit with a drive for both gripper elements.

FIG. 4 shows another embodiment of the transfer unit 12, 14 with a slide motor 255 for both gripper elements 25, 26. The first belt 259 is guided over the belt pulleys 258, 268 of the two spindles 252, 262, wherein the first spindle 252 rotates in clockwise direction and the second spindle 262 rotates in anticlockwise direction. When one gripper element moves forward in the y-direction, the other gripper element moves rearwards in the y-direction at the same time.

FIG. 5 shows the finishing installation 1 with the second transfer unit 14 during the feeding of the cable loop 210 to a sleeving station 53 for equipping the trailing cable end 212 with a sleeve 222. As soon as the second gripper 2611 has reached the correct transfer position in the x-direction, the gripper 2611 is moved forward in the y-direction and the cable end 212 stripped of insulation is guided into the sleeving station 53. The second transfer unit 14 during the take-over of a cable loop 210 from the first transfer station 22 is shown in broken lines. At the same time, the first transfer unit 12 is in the course of take-over of the leading cable end 211 from the loop-laying device 8 or the trailing cable end 212 from the cable changer 6.

FIG. 6 shows the finishing installation 1 with the second transfer unit 14 during the delivery of the cable loop 210 fully finished. The grippers 2511, 2611 are opened and the cable loop 210 gets into a not-illustrated cable deposit. The second transfer unit 14 during the take-over of a cable loop 210 from the first transfer station 22 is shown by broken lines. At the same time, the first transfer unit 12 is in the course of take-over of the leading cable end 211 from the loop-laying device 8 or of the trailing cable end 212 from the cable changer 6.

Figure 7:
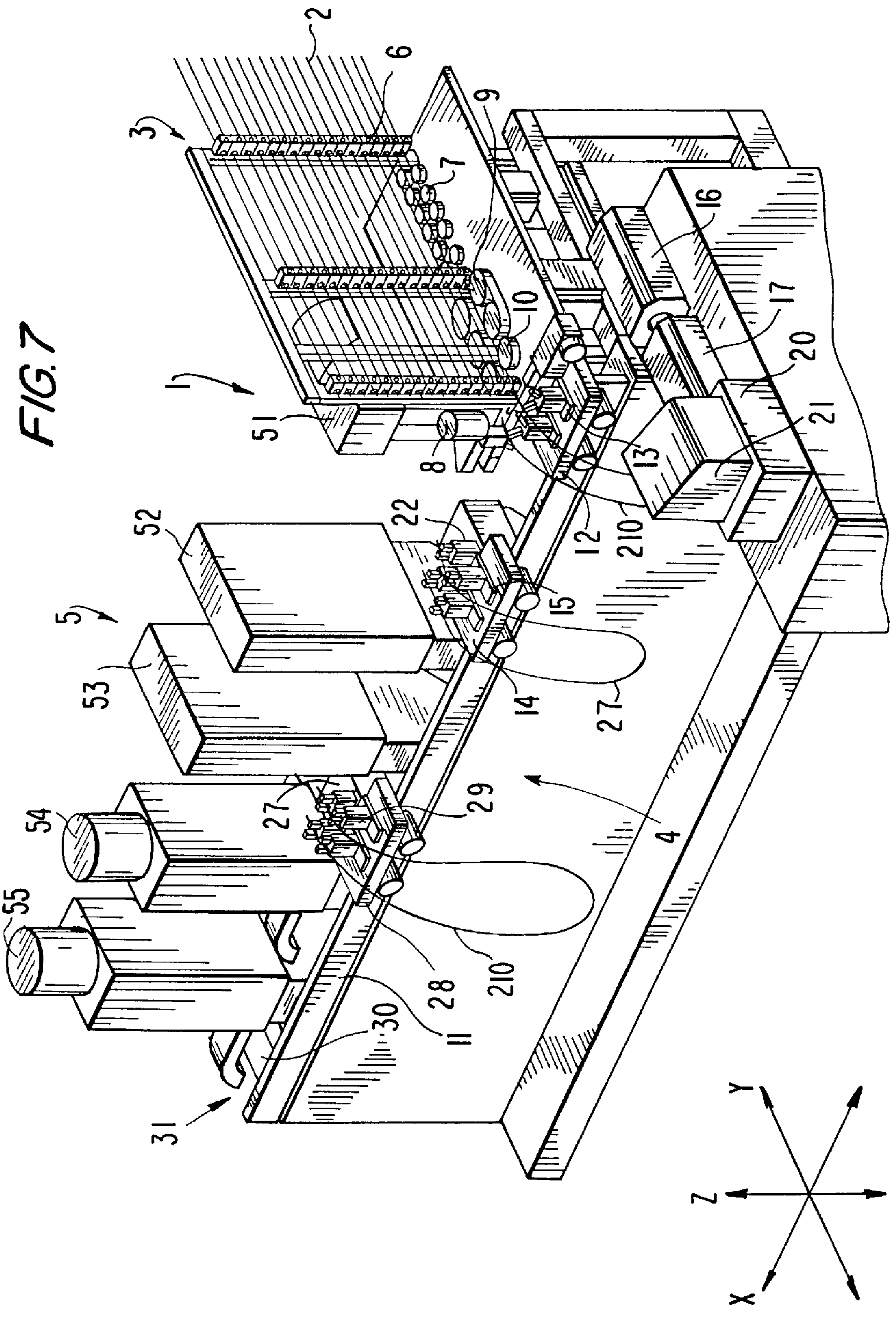
FIG. 7 shows a finishing installation with finishing units and a cable feeder with three transfer units.

FIG. 7 shows a finishing installation 1 with finishing units 5 and a cable feeder 4 with a second transfer station 27 and a third transfer unit 28 with a drive 30 and with gripper unit 29. The drive 30 can be, for example, a stepping motor which drives the transfer unit 28 linearly by means of a third toothed belt 31. As a variant, the drive 30 can also be, for example, a linear drive with a linear motor. The direction of movement of the transfer units 28 is denoted by x. The directions of movement of the gripper unit 25 are denoted by y and z. A control apparatus 20 controls and monitors the finishing installation 1, wherein the movements of, in particular, the transfer units 12, 14 and 28 and the gripper units 13, 15 and 29 are freely programmable. The construction of the second transfer station 27 and the third transfer unit 28 corresponds with the aforementioned first transfer station 22 and the aforementioned second transfer unit 14, respectively. The sequence of a crimping operation can take place, for example, as follows: the first transfer unit 12 brings the cable loop 210 as described above to the first transfer station 22. The second transfer unit 14 takes over the cable loop 210 as described above at the first transfer station 22 and brings it to specific finishing units 5, for example for equipping with a sleeve. The cable loop 210 is then brought by means of the second transfer unit 14 to the second transfer station 27. The third transfer unit 28 takes over the cable loop 210 at the second transfer station 27 and brings it to further finishing units 5, for example for connection of the cable end 211, 212, which is stripped of insulation, with a crimping contact 231, 232. Subsequently, the third transfer unit 28 moves towards the delivery position and delivers the cable loop 210 fully finished. The transfer units 12, 14 and 28 with the gripper units 13, 15 and 29 operate simultaneously. While, for example, a first cable loop 210 is taken over from the loop-laying device 8 or from the cable changer 6 by the first transfer unit 12 by means of the first gripper unit 13, a second cable loop 210 is brought by the second transfer unit 14 for equipping with a sleeve, whilst the third transfer unit 28 delivers a cable loop 210 fully finished.

Figure 8:
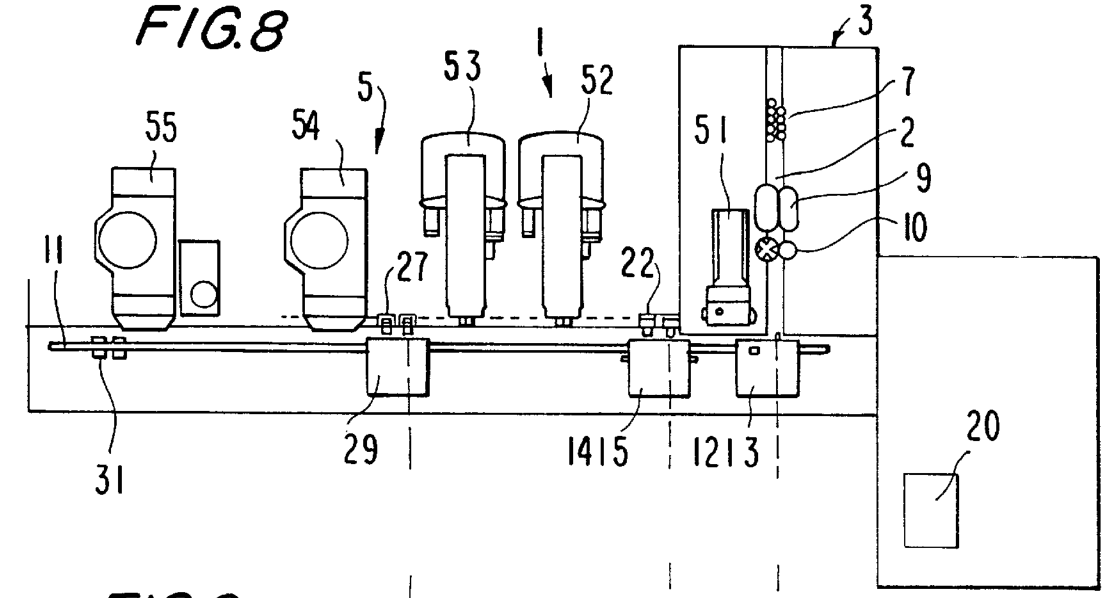
FIG. 8 shows in plan view, the finishing installation with three transfer units.

FIG. 8 shows the finishing installation 1 with a cable changer 6, an insulation-stripping station 51, two sleeving stations 52, 53, two crimping stations 54, 55, three transfer units 12, 14, 28, two transfer stations 22, 27 and a delivery station 31 in plan view.

Figure 9:
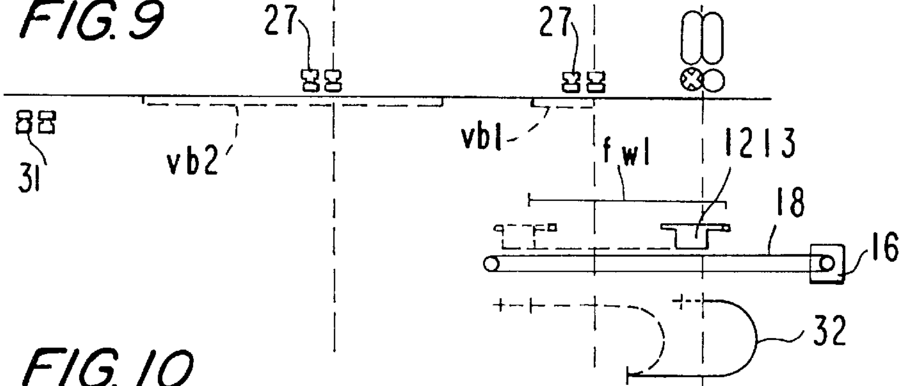
FIGS. 9 to 11 show the adjustment ranges of the transfer stations and the travel paths of the transfer units.

FIG. 9 shows the adjustment ranges vb1 and vb2 of the first transfer station 22 and the second transfer station 27, respectively, and the travel path fw1 of the first transfer unit 12. A first drag chain 32 serves for holding the energy lines, control lines and pneumatic ducts for the supply and control of the first transfer unit 12. The first transfer unit 12 can move from the cable changer 6 in the direction of the delivery station 31 to the end of the adjustment range vbl of the first transfer station 22 and conversely.

FIG. 10 shows the travel path fw2 of the second transfer unit 14. A second drag chain 33 serves for holding the energy lines, control lines and pneumatic ducts for the supply and control of the second transfer unit 14. The second transfer unit 14 can move from the first transfer station 22 in the direction of the delivery station 31 to the end of the adjustment range vb2 of the second transfer station 27 and conversely.

Figure 11:
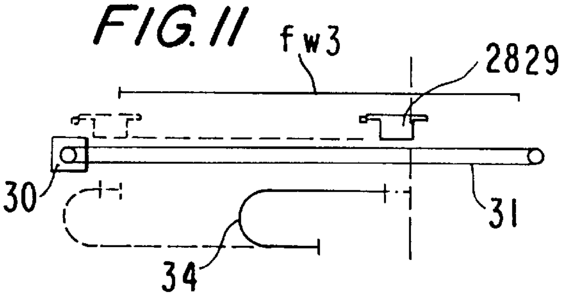

FIG. 11 shows the travel path fw3 of the third transfer unit 28. A third drag chain 34 serves for holding the energy lines, control lines and pneumatic ducts for the supply and control of the third transfer unit 28. The third transfer unit 28 can move from the second transfer station 27 to the delivery station 31 and conversely.

In a further embodiment, the drive for each gripper element 25, 26 in the y direction can take place centrally from a motor with a splined shaft leading along the finishing installation 1.

Further finishing units and/or a different sequence and/or a different spacing of the finishing units are possible. The respective positions of the finishing units are determined manually in that the transfer unit 12, 14 and 28 is brought manually to the appropriate position or determined by means of a learning travel of the transfer unit 12, 14 and 28. The control equipment then knows the exact position and the sequence of the finishing units. On the basis of these machine parameters, the control equipment automatically determines the sequence of the feeding instructions and/or optimises the travel times of the transfer units 12, 14 and 28 within the travel path fw1, fw2 and fw3.

For the feeding of cable ends to finishing units, automotive transfer units can also in a further variant of embodiment, be provided with gripper units which can communicate with each other and/or with the control equipment. The automotive transfer units travel within their travel path in freely programmable manner to the finishing units. The drive, for example an alternating current servomotor, is arranged on the transfer unit which is coupled by means of a gearwheel with a fixed toothed rack. The drive of the transfer unit is also possible by means of a linear motor.

The invention is not limited by the embodiments described above which are presented as examples only but can be modified in various ways within the scope of protection defined by the appended patent claims.

We claim:

1. Equipment for linear feeding of cable ends to finishing units which process the cable ends, comprising: a transfer guide; a cable feeder having at least one transfer unit which is movable in a forward and rearward direction (x) along the transfer guide; and a gripper unit operative to move the cable ends in at least one direction, the gripper unit being arranged at the transfer unit, the transfer unit together with the gripper unit being operatively arranged to take over, feed and deliver the cable ends.

2. Equipment according to claim 1, wherein the transfer unit is movable linearly in one direction (x) and the gripper unit is movable linearly in at least one other direction (y, z).

3. Equipment according to claim 1, wherein more than one transfer unit is provided, the transfer units operating independently of each other.

4. Equipment according to claim 1, wherein more than one gripper unit is provided, the gripper units being operative independently of each other.

5. Equipment according to claim 2, wherein the gripper unit includes gripper elements which are movable independently of each other, the gripper elements having grippers.

6. Equipment according to claim 5, wherein each of the gripper elements is movable in a y-direction by a spindle.

7. Equipment according to claim 5, wherein the gripper is movable in a z-direction.

* * * * *